United States Patent [19]

Heitmann

[11] Patent Number: 5,047,872
[45] Date of Patent: Sep. 10, 1991

[54] FAST AND SLOW PLAYBACK METHOD AND APPARATUS FOR DATA RECORDED ON MAGNETIC TAPE

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 311,939

[22] Filed: Feb. 16, 1989

[30] Foreign Application Priority Data

Feb. 22, 1988 [DE] Fed. Rep. of Germany ....... 3805436

[51] Int. Cl.$^5$ ..................... H04N 5/78; G11B 21/02
[52] U.S. Cl. ............................... 360/10.2; 360/73.06; 360/77.16
[58] Field of Search ................. 360/8, 9.1, 10.1, 10.2, 360/10.3, 32, 64, 73.06, 77.07, 77.13, 77.16, 108, 35.1, 33.1; 358/312, 335, 341, 342

[56] References Cited

U.S. PATENT DOCUMENTS

| | | | |
|---|---|---|---|
| 3,333,063 | 7/1967 | Stratton | 360/64 |
| 3,673,349 | 6/1972 | Berg et al. | 360/108 X |
| 4,486,792 | 12/1984 | Edakudo et al. | 360/10.3 |
| 4,511,934 | 4/1985 | Ohira et al. | 360/108 |
| 4,558,376 | 12/1985 | Heitmann | 360/10.1 |
| 4,590,523 | 5/1986 | Honjo et al. | 360/10.3 |
| 4,680,648 | 7/1987 | Takayama | 360/10.3 |
| 4,682,247 | 7/1987 | Doutsbo | 360/10.3 |
| 4,703,370 | 10/1987 | Inoue et al. | 360/10.3 |
| 4,841,380 | 6/1989 | Kozuki et al. | 360/10.2 |
| 4,864,430 | 9/1989 | Yoshimura et al. | 360/10.2 |
| 4,878,133 | 10/1989 | Takimoto | 360/64 |

FOREIGN PATENT DOCUMENTS 3045543 10/1987 Fed. Rep. of Germany .

OTHER PUBLICATIONS

"The Digital Television Tape Recorder-Audio and Data Recording Aspects"-SMPTE Journal, Jan. 1986, by Kenneth P. Davies.
"Standard for Recording Digital Television Signals on Magnetic Tape in Cassettes" of the European Broadcasting Union (EBU), Tech. 3252—E.

Primary Examiner—Aristotelis M. Psitos
Assistant Examiner—Andrew L. Sniezek
Attorney, Agent, or Firm—Frishauf, Holtz, Goodman & Woodward

[57] ABSTRACT

The rotary headwheel device for scanning oblique tracks on an advancing magnetic tape is provided with normal playback heads which follow the recording heads and trace the path of the same oblique tracks and also with auxiliary playback heads which trace the path of the respective tracks which the normal playback heads trace but do so 6 and ½ revolutions in advance. In order to improve display of the content of recorded digital television signals in a slowed down or accelerated motion mode, the auxiliary playback heads are shifted axially to offset them by a half track width from their position useful for audio processing, whenever the magnetic tape playback speed is off-normal. At such times the outputs of the several normal playback heads are evaluated as to error rate and if any of these outputs exceeds a reference error rate, a switchover unit on the rotary scanning device switches the rotary transformers, which carry the playback outputs to processing channels, from the normal playback heads to the auxiliary playback heads. The error rates are then measured and evaluated for the auxiliary playback heads, and when one of them shows an error rate exceeding the reference error rate, the rotary transformers are switched back to the normal playback heads and so on. The mechanical shift of the relative offset between auxiliary playback heads and normal playback heads is made and maintained electromagnetically for the duraton of off-normal tape speed operation in playback.

10 Claims, 4 Drawing Sheets

FAST AND SLOW PLAYBACK METHOD AND APPARATUS FOR DATA RECORDED ON MAGNETIC TAPE

The invention concerns a method and apparatus for playback of data signals recorded on magnetic tape by a magnetic recording and reproducing apparatus having a rotary device around which a magnetic tape is wound in a helical loop with the help of a stationary drum making a gap in which the rotary body resolves. The rotary device includes a headwheel carrying normal playback magnetic heads.

In a known method for magnetic recording and playback of digital television signals the data rate for a video magnetic head is reduced by distribution of the data stream into four parallel channels. Four magnetic heads are disposed on a headwheel disc or drum at equal spacings for recording and likewise four magnetic heads for playback. The four recording magnetic heads pass successively in contact with a magnetic tape helically looped around the headwheel disc and write into the magnetic tape data disposed in tracks running obliquely to the longitudinal direction of the tape. In the mid-portion of each track are short track sections which contain audio information.

Further details of this known method and the apparatus used therefor are given in the publication "Standard for Recording Digital Television Signals on Magnetic Tapes in Cassettes" of the European Broadcasting Union, Tech. 352 2-E and in the periodical "Fernseh- und Kinotechnik", 1987, pgs. 15–22.

The four normal playback heads of the above-mentioned equipment are so positioned that they can also be used to provide an immediate reproduction of data signals just recorded (post-recording tape check).

It has already been proposed, in copending application Ser. No. 286,317, filed Dec. 19, 1988, now U.S. Pat. No. 4,939,605 provide some processing of audio information already recorded in the short track sections by playing back the information, processing it and then re-recording it, in a single pass through the machine, by the use of four supplementary magnetic heads referred to as auxiliary magnetic heads or sometimes as advanced magnetic heads. Each normal playback magnetic head is associated with an auxiliary magnetic head in that system. The track position of the auxiliary magnetic head is several track intervals in advance of the track and contemporarily scanned by the corresponding normal playback magnetic head. In that system, as in other video tape recording and playback systems, when recorded signals are played back at a speed different from that of recording of the signals, the playback scanning no longer coincides with the recorded tracks. The playback heads cross the recorded tracks at an angle that varies according to the direction of tape transport and the speed of tape advance through the machine. In consequence it is not possible to obtain undisturbed or nearly undisturbed display of data in time extended or time-compression playback.

A method of playback of video signals recorded in individual tracks on magnetic tape according to the oblique track method in which the playback speed can be different from the recording speed is known from U.S. Pat. No. 4,558,376 and published German patent application (OS) 30 45 543 in which the information of a television picture is distributed over several tracks and within which during the playback the scanning pattern does not coincide with the recorded tracks, having the feature that only those timewise sections of signals produced by the scanning of recorded tracks that meet the prescribed requirements are temporarily stored and these temporarily stored signals which correspond to the television standard are then read out. In this known method at least two of the magnetic heads are simultaneously in contact with the magnetic tape and the relative positions of the magnetic heads with respect to each other is so chosen that as many magnetic heads as possible will be positioned on recorded tracks. Supplementary magnetic heads are accordingly required which follow the recorded tracks with the assistance of dynamic actuators. The individual actuators are controlled by a signals dependent upon the tape transport speed setting at the time. The switching between normal and supplementary playback heads takes place in accordance with the rotary position of the headwheel.

SUMMARY OF THE INVENTION

It is an object of the present invention to provide a method and apparatus of the general kind above-mentioned which are less complicated and expensive and which are suitable for the playback of data signals.

Briefly, when the tape transport speed is changed from a speed equal to the tape speed at which the data signals to be played back were recorded to a speed different from that tape speed, without making a corresponding change in the speed of the headwheel, a common shift of the respective track positions of all the auxiliary playback magnetic heads relative to the track positions of the normal playback magnetic heads is performed. The error rates of data signals reproduced by the playback magnetic heads connected to data output channels are measured and evaluated. The output channels are switched alternately to the outputs of the normal playback magnetic heads and to the outputs of the auxiliary playback magnetic heads in response to an error rate evaluation exceeding a predetermined value. That value depends upon the average error rate of the particular recording and reproducing apparatus. Whenever the tape transport speed is restored to the same speed used in recording the data signals, a common shift in the track position of the auxiliary playback magnetic heads is made to bring them back to their positions used for playback at the recording speed.

The method of the invention has the advantage that already present auxiliary magnetic heads are given an additional utility, that of switching between normal playback heads and auxiliary playback heads, performed in a manner dependent upon the error rate. By control of the switching in a manner dependent upon the reproduced signal, electrical and mechanical tolerance limits are observed which are never brought into consideration in the known multispeed playback systems.

It is particularly advantageous for the commmon shift to amount mechanically to half a track width. In this sense, a track width includes a share of the borders, so that a shift of half a track width would shift from a position centered on a track to a position centered midway between two tracks. This shift may be provided by mounting the auxiliary playback magnetic heads on a second rotating disc which is mounted so as to be axially shiftable with respect to the headwheel. Alternatively actuator means may be provided on the headwheel for shifting all of the auxiliary playback magnetic heads in the direction of the axis of the headwheel. The evaluation of the error rates is preferably performed by comparing each signal error rate with a reference error rate and then, when errors in the data signal in any output channel are found to reach or exceed the reference error rate, producing a switchover to the alternate switch connection by means of a control signal. It is particulary useful to transmit a control signal optically from the stationary part of the apparatus where the error rates are compared over to a sensor mounted on the headwheel.

BRIEF DESCRIPTION OF THE DRAWINGS

The invention is further described by way of illustrative example with reference to the annexed drawings, in which.

DESCRIPTION OF THE ILLUSTRATED METHOD AND APPARATUS

Figure 1:
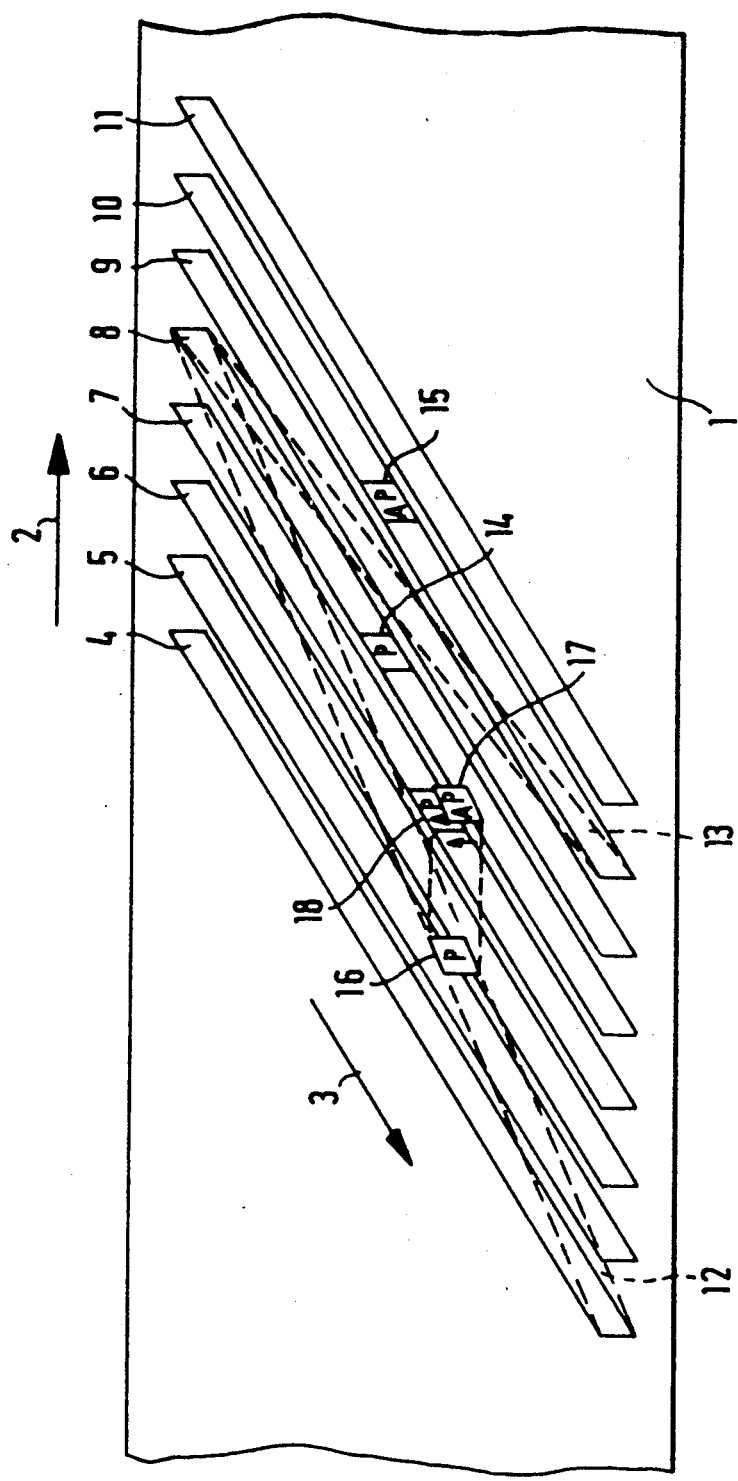
FIG. 1 is a diagram of a pattern of oblique tracks in a magnetic tape.
Figure 2:
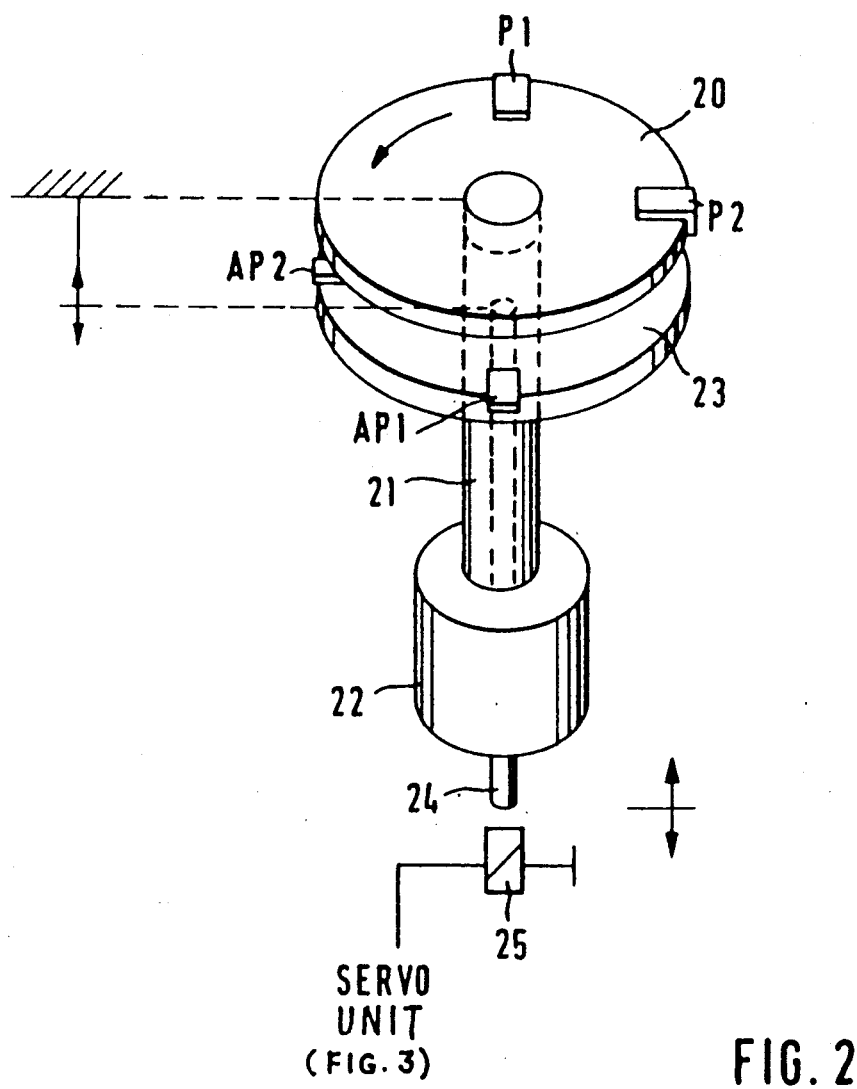
FIG. 2 is a perspective view of a headwheel drive with means for axially shifting auxiliary playback heads relative to normal playback heads.

FIG. 1 shows a section of a magnetic tape 1 which is moved in the direction of the arrow 2 past an obliquely set rotary scanning device of the kind shown in FIG. 2 which scans the tape in the oblique direction indicated by the arrow 3. In recording with such device tracks running obliquely to the tape edges are recorded, of which only tracks 4, 5 ... 11 are illustrated in order to simplify the drawing. Zones without signals are located between the individual tracks. These zones are hereinafter referred to as borders.

The broken line scanning stripes 12 and 13 are examples of the scanning paths of playback heads with tape speeds different from the recording tape speed. In the case of the scanning path 12 the playback tape advance speed is greater, and in the case the scanning path 13 it is smaller, than the tape recording tape speed.

The angle of the scanning path changes corresponding to the ratio of the playback tape advance speed to the recording tape advance speed. At the same time the scanning paths intersect often the recorded tracks and the border pieces lying between them. For example the scanning path 12 beginning at one end of the recorded track 8 crosses the tracks 7, 6 and 5 as well as the associated borders before it reaches the end of the track 4.

A normal playback magnetic head P is shown in the track 8 at 14. On the track 10 at 15 is shown an auxiliary playback magnetic head AP. The track position offset between these two magnetic heads usually is a greater number of tracks, e.g. 6 tracks, so that the auxiliary magnetic head AP can read recorded tracks for their evaluation six tracks ahead of the normal playback head P. To facilitate comprehension of the drawing, however, the magnetic heads in question are shown offset from each other by only two tracks.

If the playback tape transport speed is the same as tape transport speed that was used in recording, both the normal playback head P and the auxiliary playback head AP will correctly scan a recording track. If however the playback speed differs from the recording speed, both magnetic heads soon abandon their tracks and get into the region of the border, as shown at 16 and 17. In this region the signal to noise margin of the reproduced data signal deteriorates. The error rate in the reproduced data correspondingly rises, so that a reproduced television picture made from the data signal shows disturbances.

In order to keep disturbance components in playback at a low level, the track pattern position of the auxiliary playback heads is shifted in accordance with the invention so that the normal playback head P is additionally offset by half a track width from the corresponding auxiliary magnetic head AP. The auxiliary playback head AP is thus moved from position 17 to position 18 where it is again centered on a track and can read data signals with a small error rate.

FIG. 2 shows an illustrative embodiment for shifting the track position offset between the normal playback heads P and the auxiliary playback heads AP. Two normal playback heads P1 and P2 are affixed to the upper side of a first rotating headwheel disc 20. The headwheel disc 20 is made to rotate by a motor 22 acting over a shaft 21. The shaft 21 also drives a second rotary headwheel disc 23 parallel to the first headwheel disc 20. The headwheel disc 23 carries two auxiliary playback heads AP1 and AP2 on the periphery of its upper side. By means of a shaft 24 running coaxially in the shaft 21 the spacing between the two headwheel discs 20 and 23 can be changed and thereby the track offset between the playback magnetic heads. The shaft 24 is shifted axially under control of the solenoid 25 which can pull the shaft 24 downward against the force of a spring not shown in the drawing. Since only about half a track width of movement is involved the disc 23 can easily be supported by the shaft 24 through slots (not shown) in the shaft 21.

Figure 4:
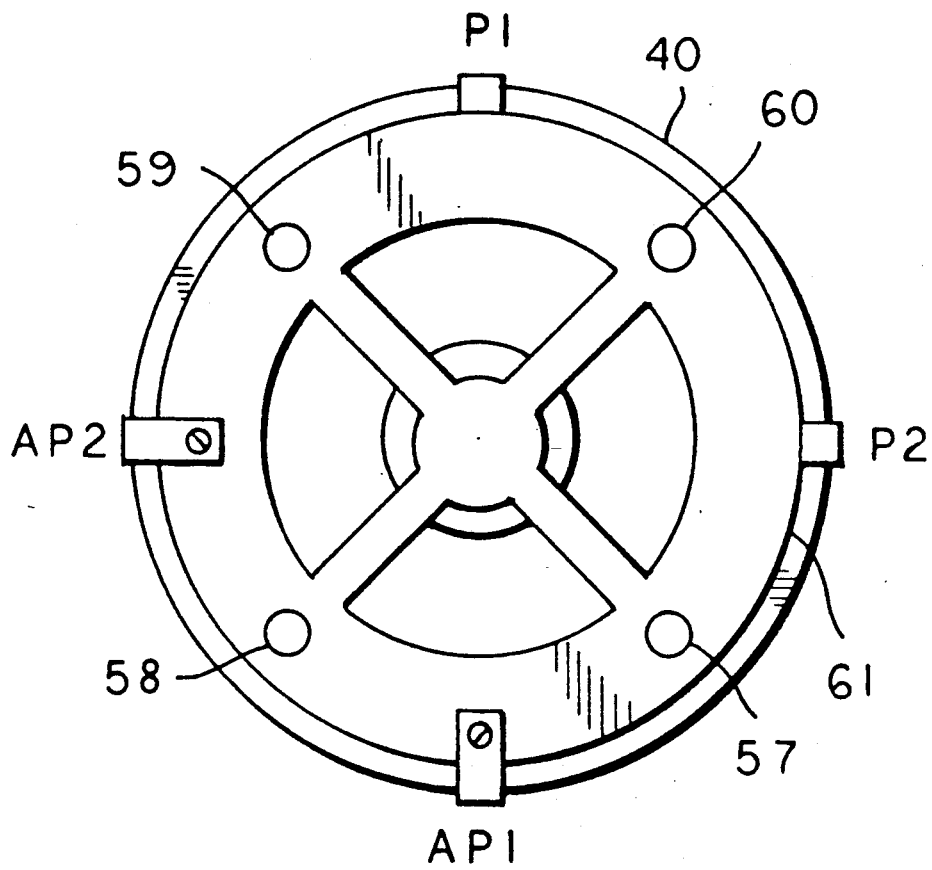
FIG. 4 is a perspective view of a headwheel equipped with an actuator for axially shifting auxiliary playback heads.

In another example shown in FIG. 4, the advanced scanning auxiliary magnetic heads AP1 and AP2 are mechanically connected to the headwheel disc 40 by an annular actuator plate 61 which is mounted so that it is axially shiftable by the solenoid 62 acting by members 63 connected to its spring-mounted armature (not visible in the drawing), in response to a switching voltage that is supplied to the solenoid 62 by conductors not shown. The guide pins 57, 58, 59 and 60 confine the actuator plate 61 to axial movement.

In both illustrative examples all the auxiliary playback heads APn are simultaneously shifted in track position by half of the track spacing. There is no dynamic guiding of individual magnetic heads and the additional circuit cost and complication for dynamic guiding which characterize some of the above-described previously known devices is not necessary.

Figure 3:
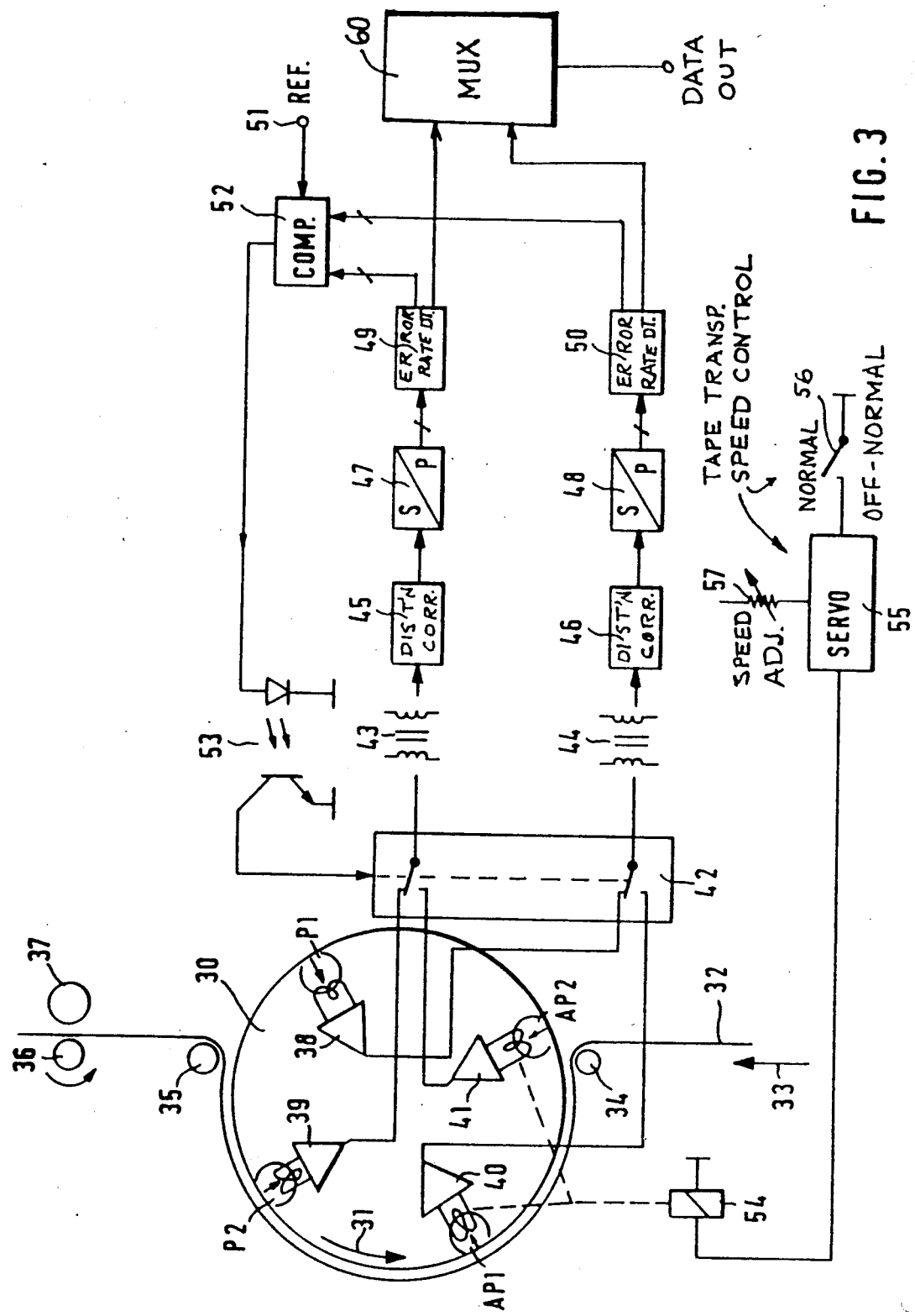
FIG. 3 is a block circuit diagram of equipment according to the invention by which the method of the invention may be explained.

FIG. 3 shows a headwheel disc 30 which rotates in the direction indicated by the arrow 31. The headwheel disc 30 could also be a rotary drum, for example, internally accomodating some of the circuit elements that it carries. A magnetic tape 32 is looped around the headwheel 30 the usual way for writing and reading oblique tracks on the tape. Two guide rollers 34 and 35 lead the tape 32 (which arrives in the direction 33) around the headwheel as it is pulled by the tape drive shaft 36, between which and the upper pressure roller 37 the tape passes. Four playback magnetic heads P1, P2, AP1 and AP2 are fixed on the periphery of the headwheel 30. These playback heads are centered at successive circumferential spacings of 90°. Each normal playback playback head P1, P2 has a forerunner auxiliary playback head AP1, AP2 on the opposite side of the headwheel.

The playback heads are respectively connected to the inputs of playback preamplifiers 38, 39, 40 and 41. The outputs of these preamplifiers are respectively connected to inputs of a switchover unit 42, the outputs of which are supplied through rotary transformers 33 and 34 to the stages 45 and 46 which serve for removal of distorsion and recovery of digital serial data signals suitable for further processing. These serial data signals are converted to parallel word form in series-to-parallel converters 47 and 48 after which they are processed in error rate detectors 49 and 50, which use conventional error detection circuits and conventional means for determining the rate of occurrence of detected errors. The particular type of error detection depends upon the kind of check bits or check words provided in the recording of the digital signals.

The error rate outputs of the circuits 49 and 50, as well as a reference error rate signals made available at a terminal 51 are supplied to a comparator circuit 52 which individually compares the respective outputs of the circuit 49 and 50 with a reference error rate signal from the terminal 51. Whenever the reference error rate is exceeded in either of the two channels, an output signal is produced by the comparator which is supplied to an optical transmission device 53, composed for example of a light emitting diode and a phototransistor, which passes on the signal to cause the switchover device 42 to switch over from one set of outputs, e.g. the outputs of the preamplifiers 38 and 39, to the other set of preamplifier outputs, e.g. 40 and 41. The reference error rate is sufficiently high to assure that the other set of preamplifier outputs will have a lower error rate by virtue of the odd one-half line-width offset between the normal playback heads and the auxiliary playback heads.

FIG. 3 also shows the control for providing the odd one half line-width offset when the tape transport speed is off-normal, which is when the high error rates are likely to require the automatic switching of the switchover unit 42. The solenoid magnet 54 of FIG. 3 corresponds to the magnet 25 of FIG. 2 and is activated by the servo unit 55 which responds to the switch 56 which is closed whenever the tape transport speed is off-normal. The servo 55, in addition to controlling the solenoid 54 also controls tape transport speed when the switch 56 is in the off-normal position. It has an adjusting element 57 for controlling an off-normal tape transport speed. It may also have a reversing switch not shown in the drawing.

In the diagram of FIG. 3, in order to simplify the presentation and explanation of the invention, only two channels respectively serving two normal playback heads and their respective forerunner auxiliary magnetic heads are shown. Of course it is also possible and expectable in a larger number of transmission channels serving additional playback heads to be used. For example, with the 90° spacing shown in FIG. 3 there would usually be two more normal playback heads, two more auxiliary playback heads and two more data output channels (for a total of 4 of each). The separate output channels are normally multiplexed into a single digital data stream for later processing, as shown in FIG. 3 by the presence of the multiplexer 60. There may be more processing than shown in FIG. 3 before the multiplexing is done, however.

It will therefore be seen that although the invention has been described with respect to particular illustrative examples, variations and modifications are possible within the inventive concept.

I claim:

1. Method of reproducing data signals with a magnetic recording and reproducing apparatus having a rotary device around which a magnetic tape is would in a helical loop, with normal playback magnetic heads (P1, P2) mounted on a periphery of said rotary device and auxiliary playback magnetic heads (AP1, AP2) mounted also on the periphery of said rotary device for scanning tracks of a magnetic tape before they reach said normal playback heads and therefore having track positions relative to said tape which are respectively different from track positions of said normal playback heads, comprising the steps of:

changing a tape transport speed for reproducing data signals recorded on a tape from a speed equal to tape speed at which said signals were recorded to a different tape speed with respect to the tape speed at which said signals were recorded;

simultaneously shifting all said auxiliary playback magnetic heads relative to the track positions of said normal playback magnetic heads by an axial displacement of half a track width of said auxiliary playback magnetic heads during a tape transport speed change from said tape speed at which said signals were recorded to said different tape speed;

reproducing said data signals by said normal playback heads and said auxiliary playback magnetic heads;

measuring error rates of each of the reproduced data signals;

providing a predetermine error rate corresponding to said apparatus;

comparing the measured error rates with said predetermined error rate;

selecting only those reproduced data signals whose respective error rates are lower than the predetermined error rate for further data signal processing; and simultaneously shifting all said auxiliary playback magnetic heads back to their original positions with respect to said normal playback magnetic heads during a corresponding tape transport speed change from said different tape speed to said tape speed at which said signals were recorded.

2. Method according to claim 1, wherein said simultaneous shifting of said auxiliary playback magnetic heads is performed by axially shifting a disk on which said auxiliary playback magnetic heads are mounted, which disk is a part of said rotary device which is axially shiftable away from and towards a disk on which said normal playback heads are mounted.

3. Method according to claim 2, wherein said simultaneous shifting of said auxiliary playback magnetic heads is performed by shifting a position of actuator means provided as part of said rotary device for axially shifting each of auxiliary playback magnetic heads by equal offsets with respect to the remainder of aid rotary device.

4. Method according to claim 1, wherein the selecting of said reproduced data signals having error rates lower than the predetermined error rate is performed on said rotary device in response to a control signal derived by comparing each of said measured error rates with said predetermined error rate in a stationary portion of said magnetic recording and reproducing apparatus and wherein said derived control signal is optically transmitted from a stationary part of said apparatus to a control circuit on said rotary device, which controls a switching means mounted on said rotary device.

5. Method according to claim 1, wherein preamplifiers respectively for each of said normal and auxiliary playback magnetic heads and also a switching means connected to outputs of said amplifiers are provided on said rotary device and rotary transformers connected to outputs of said switching means are provided for coupling respective inputs of output channels located on a stationary part of said apparatus to respective outputs of said switching means.

6. Method according to claim 1, wherein each auxiliary playback magnetic head is mounted at a circumferential position on said rotary device which is at 180° from one of said normal playback magnetic heads and wherein the selection of reproduced data signals with reference to error rate includes in each case an operation of switching between a said normal playback magnetic head and that one of said auxiliary playback magnetic heads which is positioned 180° circumferentially from the position of the respective normal playback magnetic head.

7. The method of claim 6, performed on a rotary device on which each of said normal playback magnetic heads is located a circumferential spacing of 90° from at least one other normal playback magnetic head.

8. Apparatus for reproducing data signals in a magnetic data recorder and reproducer having means for reproducing data signals from a magnetic tape at a tape speed that was used to record said signals on said magnetic tape and for reproducing said data signals at selectable speeds other than the tape speed that was used to record said signals on said magnetic tape, said apparatus comprising a plurality of normal playback magnetic heads mounted on a rotary device for scanning oblique paths on magnetic tape advancing in a loop passing around said rotary device, preamplifiers on said rotary device coupled to respective normal playback magnetic heads and rotary transformers for coupling outputs of said preamplifiers to respective output channels located on a stationary portion of said recorder and reproduce, and further comprising:

auxiliary playback magnetic heads, equal in number to said normal playback magnetic heads, offset axially from positions of said normal playback magnetic heads and each auxiliary head positioned circumferentially opposite a corresponding normal playback head, for scanning a portion of said magnetic tape in advance of scanning of said portion of said magnetic tape by said normal playback magnetic heads, and located on a part of said rotary device axially shiftable from the remainder of said device for changing said offset;

a preamplifier connected to each auxiliary playback magnetic head and located on said rotary device;

switching means for individually connecting each of said rotary transformers, by respective switching elements, in an alternative in each case, either to one of said normal playback magnetic heads or to a corresponding one of said auxiliary playback magnetic heads located circumferentially opposite to the corresponding said one of said normal playback magnetic heads;

means for axially shifting said axially shiftable part of said rotary device to change a cross-track offset of positions of said respective auxiliary playback magnetic heads from positions of said respective normal play back magnetic heads by substantially half a recording track width whenever, and only for so long as, said means for reproducing data signals at selectable speeds other than the speed at which the data signals were recorded are activated;

means, operable during activation of said means for reproducing data at selectable speeds other than the speed at which the data signals were recorded, for evaluating error rates of data signals transmitted to said output channels and for providing to said switching means a control signal for switching over said elements of said switching means when said error rate exceeds a predetermined threshold error rate, and means for maintaining said switching means in a state connecting said preamplifiers of said normal playback magnetic heads to said rotary transformers whenever said means for reproducing data signals recorded on said magnetic tape at the speed at which said signals were recorded are in operation.

9. Apparatus according to claim 8, wherein each normal playback magnetic head is spaced circumferentially on said rotary device by 90° from at least one other playback magnetic head.

10. Apparatus according to claim 9, wherein there are two normal playback magnetic heads and two auxiliary playback magnetic heads.

* * * * *